United States Patent
Hamazaki et al.

(10) Patent No.: US 12,246,311 B2
(45) Date of Patent: Mar. 11, 2025

(54) HONEYCOMB STRUCTURE AND ELECTRICALLY HEATING SUPPORT

(71) Applicant: NGK INSULATORS, LTD., Nagoya (JP)

(72) Inventors: Makoto Hamazaki, Nagoya (JP); Takayuki Inoue, Nagoya (JP); Takashi Noro, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 367 days.

(21) Appl. No.: 17/929,339

(22) Filed: Sep. 2, 2022

(65) Prior Publication Data
US 2022/0410137 A1    Dec. 29, 2022

Related U.S. Application Data

(63) Continuation of application No. PCT/JP2021/008018, filed on Mar. 2, 2021.

(30) Foreign Application Priority Data

Mar. 13, 2020 (JP) .................................. 2020-044472

(51) Int. Cl.
*B01J 21/06* (2006.01)
*B01J 35/33* (2024.01)
(Continued)

(52) U.S. Cl.
CPC ............... *B01J 35/56* (2024.01); *B01J 21/06* (2013.01); *B01J 35/33* (2024.01); *F01N 3/2013* (2013.01);
(Continued)

(58) Field of Classification Search
CPC .. B01J 21/06; B01J 35/33; B01J 35/56; C04B 35/16; C04B 38/06; F01N 3/2013;
(Continued)

(56) References Cited

U.S. PATENT DOCUMENTS 6,759,151 B1 * 7/2004 Lee .......................... C04B 41/89
416/241 B
9,101,908 B2 * 8/2015 Jurng ........................ B01J 35/30
(Continued)

FOREIGN PATENT DOCUMENTS

| CN | 109428073 A | 3/2019 |
|---|---|---|
| JP | 2019-012682 A | 1/2019 |

(Continued)

OTHER PUBLICATIONS

International Search Report and Written Opinion dated May 18, 2021 (Application No. PCT/JP2021/008018).
(Continued)

*Primary Examiner* — Dapinder Singh
(74) *Attorney, Agent, or Firm* — BURR PATENT LAW, PLLC (57) ABSTRACT

A honeycomb structure made of ceramics, wherein the honeycomb structure includes: a borosilicate; and silicon particles doped with at least one dopant, the dopant is a Group 13 element or a Group 15 element, the silicon particles have a dopant amount (A) of $1\times10^{16}$ to $5\times10^{20}/cm^3$, and the honeycomb structure has a silicon particle content (B) of 30 to 80% by mass.

8 Claims, 2 Drawing Sheets

(51) Int. Cl.
  *B01J 35/56* (2024.01)
  *F01N 3/20* (2006.01)
  *F01N 3/28* (2006.01)
  *H05B 3/14* (2006.01)

(52) U.S. Cl.
  CPC ............. *F01N 3/2828* (2013.01); *H05B 3/14* (2013.01); *F01N 2370/04* (2013.01)

(58) Field of Classification Search
  CPC ........ F01N 3/2026; F01N 3/2828; F01N 3/28; F01N 3/24; F01N 3/2809; F01N 3/2825; F01N 2370/04; H05B 3/14; H05B 3/141; H05B 3/148; H05B 3/42; H05B 2203/017; H05B 2203/019; H05B 2203/02; H05B 2203/022; H05B 2203/024; Y02T 10/12
  See application file for complete search history.

(56) References Cited

U.S. PATENT DOCUMENTS

| | | | |
|---|---|---|---|
| 10,232,298 B2* | 3/2019 | Kikuchi | ............ B01D 46/2429 |
| 10,632,409 B2* | 4/2020 | Kikuchi | ............ B01D 46/2418 |
| 11,154,847 B2* | 10/2021 | Patchett | ................ F01N 3/2825 |
| 11,913,367 B2* | 2/2024 | Kurihara | .................. B01J 35/56 |
| 2009/0246450 A1 | 10/2009 | Kunieda et al. | |
| 2012/0076698 A1* | 3/2012 | Ishihara | ................ F01N 3/2026 422/174 |
| 2013/0043236 A1* | 2/2013 | Sakashita | .................. B01J 35/56 219/553 |
| 2017/0283931 A1* | 10/2017 | Matsui | ..................... H05B 3/12 |
| 2019/0067697 A1 | 2/2019 | Ohsawa et al. | |
| 2020/0154524 A1 | 5/2020 | Tokuno et al. | |
| 2020/0323040 A1 | 10/2020 | Tokuno et al. | |

FOREIGN PATENT DOCUMENTS

| | | |
|---|---|---|
| JP | 2019-021568 A | 2/2019 |
| JP | 2019-108863 A | 7/2019 |
| JP | 2019-175608 A | 10/2019 |
| WO | 2009/118870 A1 | 10/2009 |

OTHER PUBLICATIONS

Chinese Office Action (Application No. 202180013717.8) dated Feb. 8, 2023.

* cited by examiner

HONEYCOMB STRUCTURE AND ELECTRICALLY HEATING SUPPORT

FIELD OF THE INVENTION

The present invention relates to a honeycomb structure and an electrically heating support.

BACKGROUND OF THE INVENTION

Ceramic supports having an NTC property (i.e., a property in which electrical resistance decreases as a temperature increases), which are composed of SiC, are used as supports for electrically heating catalysts (EHCs).

Here, Patent Literature 1 discloses that a support exhibiting an NTC property tends to have a bias of a temperature distribution due to local heat generation caused by concentrated current flowing in a portion where a distance between electrodes is shorter, during heating by current conduction. Then, in order to improve the bias of the temperature distribution, it discloses the use of a support having a PTC property (a property in which electric resistance increases as a temperature increases). Further, it uses, as the support, a matrix composed of a borosilicate containing an alkaline atom.

CITATION LIST

Patent Literature

[Patent Literature 1] Japanese Patent Application Publication No. 2019-012682 A

SUMMARY OF THE INVENTION

A high voltage in a range of 200 to 500 V may be applied to the EHC. At this time, in order to enable heating to a temperature range of catalytic activity within a predetermined time, it is preferable to adjust the volume resistivity of the support depending on what voltage value in that range should be applied. As a result of studies, the present inventors have found that there is room for improvement in the adjustment of the volume resistivity of the support described in Patent Literature 1.

The present invention has been made in view of the above problems. An object of the present invention is to provide a honeycomb structure and an electrically heating support, which have a PTC property and can adjust volume resistivity depending on numerical values of applied voltages.

The above problems are solved by the following inventions. The present inventions are specified as follows:
(1)
A honeycomb structure made of ceramics,
wherein the honeycomb structure comprises: a borosilicate; and silicon particles doped with at least one dopant,
wherein the dopant is a Group 13 element or a Group 15 element,
wherein the silicon particles have a dopant amount (A) of $1 \times 10^{16}$ to $5 \times 10^{20}/cm^3$, and
wherein the honeycomb structure has a silicon particle content (B) of 30 to 80% by mass.
(2)
An electrically heating support, comprising:
the honeycomb structure according to (1);
electrode layers provided on a surface of the honeycomb structure; and
pillar shaped electrode terminals provided on the electrode layers, respectively.

According to the present invention, it is possible to provide a honeycomb structure and an electrically heating support, which have a PTC property and can adjust volume resistivity depending on numerical values of applied voltages.

DETAILED DESCRIPTION OF THE INVENTION

Hereinafter, embodiments of a honeycomb structure and an electrically heating support according to the present invention will be described with reference to the drawings. However, the present invention is not limited to the embodiments, and various changes, modifications, and improvements may be added without departing from the scope of the present invention, based on knowledge of one of ordinary skill in the art.

<Honeycomb Structure>

Figure 1:
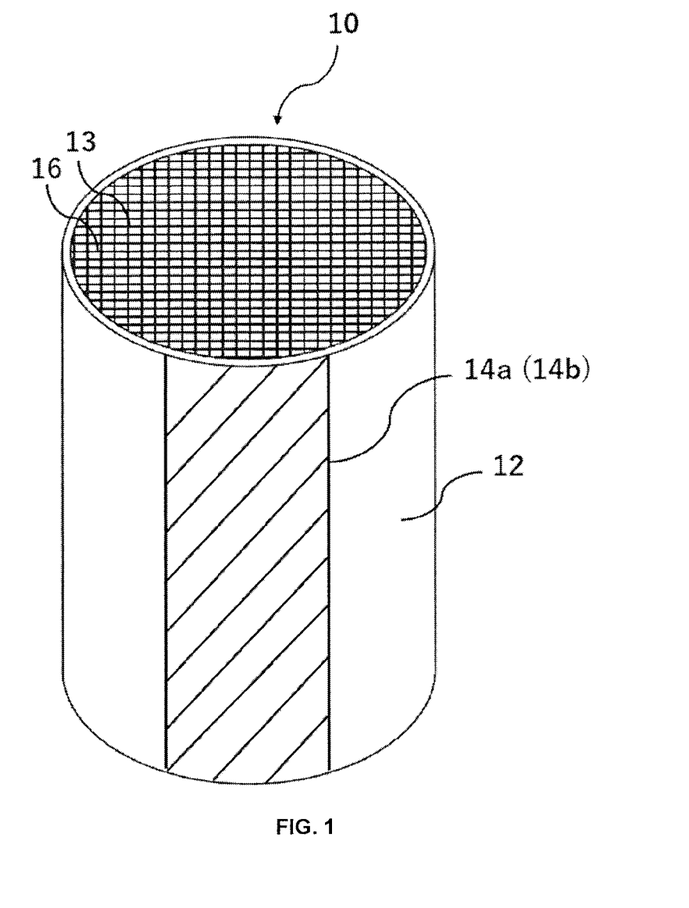
FIG. 1 is a schematic external view of a honeycomb structure of an electrically heating support according to an embodiment of the present invention.
Figure 2:
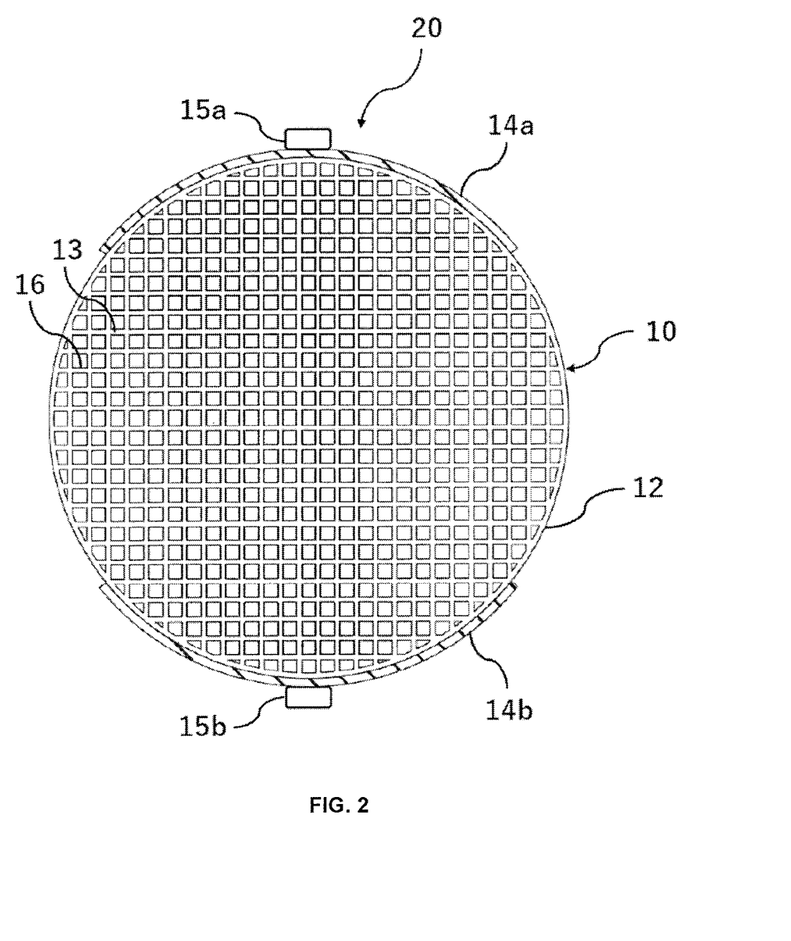
FIG. 2 is a schematic cross-sectional view of electrode layers provided on a honeycomb structure of an electrically heating support according to an embodiment of the present invention and electrode terminals provided on the electrode layers, which is perpendicular to an extending direction of cells.

FIG. 1 is a schematic external view of a honeycomb structure 10 of an electrically heating support 20 according to an embodiment of the present invention. FIG. 2 is a schematic cross-sectional view of electrode layers 14a, 14b provided on the honeycomb structure 10 of the electrically heating support 20 according to an embodiment of the present invention and electrode terminals 15a, 15b provided on the electrode layers 14a, 14b, which is perpendicular to an extending direction of cells 16.

The honeycomb structure 10 is made of ceramics and contains a borosilicate and silicon particles doped with at least one dopant. The dopant is a Group 13 element or a Group 15 element. The Group 13 element or the Group 15 element is contained as a dopant in the silicon particles in a concentration range of $1 \times 10^{16}$ to $5 \times 10^{20}/cm^3$. As used herein, the Group 13 element refers to boron (B), aluminum (Al), gallium (Ga), indium (In) and the like, and the Group 15 element refers to nitrogen (N), phosphorus (P), arsenic (As), antimony (Sb), bismuth (Bi) and the like. In general, as the concentration of the dopant in the silicon particles increases, the volume resistivity of the honeycomb structure 10 decreases, and as the concentration of the dopant in the silicon particles decreases, the volume resistivity of the honeycomb structure 10 increases. Also, the Group 13 element or the Group 15 element may easily be contained as a dopant in the silicon particles in a concentration range of $1 \times 10^{16}$ to $5 \times 10^{20}/cm^3$. The amount of the dopant in the silicon particles contained in the honeycomb structure 10 may preferably be $5 \times 10^{16}$ to $5 \times 10^{20}/cm^3$, and more preferably $5 \times 10^{17}$ to $5 \times 10^{20}/cm^3$.

Multiple types of elements may be contained, because if the dopants in the silicon particles contained in the honeycomb structure 10 are elements belonging to the same group, the electrical conductivity can be developed without being affected by counter-doping. Further, it is more preferable to contain one or two dopants selected from the group consisting of B and Al. It is also preferable to contain one or two dopants selected from the group consisting of N and P.

The concentration of the dopant in the silicon particles of the honeycomb structure 10 can be measured by, for example, the following method. Hereinafter, the case where boron is contained as the dopant will be described, but the dopant other than boron can also be measured by the same method.

First, the honeycomb structure 10 is cut on a plane perpendicular to the central axis to expose the cut plane. Then, the irregularities of the cross section of the honeycomb structure 10 are filled with a resin, and the surface filled with the resin is further polished. The polished surface of the honeycomb structure 10 is then observed, and the material making up the honeycomb structure 10 is subjected to elemental analysis by energy dispersive X-ray spectroscopy (EDX spectroscopy).

In the honeycomb structure 10, the silicon particles and the borosilicate are distinguished as follows. First, after detecting the silicon element by mapping by EDX spectroscopy, a portion where the oxygen element is further detected is determined to be "borosilicate", and a portion where the oxygen element is not detected is determined to be "silicon particles".

Subsequently, an amount of boron in the silicon particles is identified by the following method for the portion determined to be "silicon particles" by the EDX spectroscopy. First, the honeycomb structure 10 including the position determined to be "silicon particles" is cut to a thickness of several millimeters, and a cross section of the cut honeycomb structure is prepared by using a Broad Ion Beam method to prepare a sample for measuring the amount of boron. The Broad Ion Beam method is a method for preparing a sample cross section using an argon ion beam. More particularly, it refers to a method for preparing a cross section of a sample along an end face of a shielding plate by placing the shielding plate directly above the sample and irradiating the sample with a broad ion beam of argon to etch the sample. The sample subjected to the cross-sectional preparing is analyzed for boron in the silicon particles by a time-of-flight secondary ion mass spectrometry (TOF-SIMS). In the time-of-flight secondary ion mass spectrometry, the sample is first irradiated with a primary ion beam, and secondary ions are released from the surface of the sample. The released secondary ions are then introduced into a time-of-flight mass spectrometer to obtain a mass spectrum of the outermost surface of the sample. The sample is then analyzed based on the obtained mass spectrum, and a concentration of boron in the silicon particles (number/cm$^3$) is determined by conversion based on correlation between a spectral intensity of boron in the silicon particles and a measured value of the concentration previously measured (for example, a calibration curve or the like).

The silicon particle content in the honeycomb structure 10 is 30 to 80% by mass. By controlling the silicon particle content in the honeycomb structure 10 in the range of 30 to 80% by mass, it is difficult to block a conductive path due to silicon oxidation, an increase in electrical resistance is suppressed, and high oxidation resistance can be exhibited, even if the honeycomb structure 10 is exposed to an oxidizing atmosphere at an elevated temperature of 1000° C. The silicon particle content in the honeycomb structure 10 is preferably 30 to 50% by mass, and more preferably 30 to 45% by mass, and even more preferably 35 to 45% by mass, in terms of further improving the above effects, increasing the softening point of the honeycomb structure 10 and the like. A percentage of change in electrical resistance employs a value measured as follows. A sample of the honeycomb structure is prepared, which has been pre-oxidized by maintaining it in an air atmosphere at 1000° C. for 10 hours. For this sample, the electrical resistivity before and after maintaining at 1000° C. for 50 hours in the air atmosphere is measured. The electrical resistivity of the honeycomb structure is an average value of measured values (n=3) measured by the four-terminal method. Then, the absolute value of a value calculated by the equation: 100×{(electric resistivity after durability after maintaining at 1000° C. for 50 hours)−(initial electrical resistivity before maintaining at 1000° C. for 50 hours)}/(initial electrical resistivity before maintaining at 1000° C. for 50 hours) is defined as the percentage of change in electrical resistivity.

Examples of the method for calculating the silicon particle content in the honeycomb structure 10 include the following methods. First, by the EDX spectroscopy, the portions of "borosilicate" and "silicon particles" are distinguished, and a volume ratio of the "borosilicate" and the "silicon particles" is calculated. From the result, the content of "silicon particles" is calculated using the material true densities of the borosilicate and the silicon particles.

As described above, it is possible for the honeycomb structure 10 to adjust the volume resistance according to the numerical value of the applied voltage by controlling the amount of the dopant in the silicon particles and the silicon particle content in the honeycomb structure. The volume resistivity of the honeycomb structure 10 can be 1 to 100 Ω·cm for a higher voltage greater than 60 V, and typically 5 to 100 Ω·cm. Further, for a lower voltage of 60 V or less such as 48 V, it can be 0.001 to 5 Ω·cm, and typically 0.001 to 2 Ω·cm, and more typically 0.01 to 1 Ω·cm.

It is preferable that 50% by mass or more of the total mass of the honeycomb structure 10 excluding the silicon particle content is the borosilicate. When 50% by mass or more of the total mass of the honeycomb structure 10 excluding the silicon particle content is the borosilicate, the thermal impact resistance tends to be improved due to the lower thermal expansion coefficient. It is even more preferable that 55% by mass or more of the total mass of the honeycomb structure 10 excluding the silicon particle content is the borosilicate.

The silicon particles contained in the honeycomb structure 10 may contain impurities such as Al and Fe. In this case, each of the contents of the impurities Al and Fe in the silicon particles contained in the honeycomb structure 10 is preferably 2% by mass or less based on the silicon particles. When each of the contents of the impurities Al and Fe in the silicon particles contained in the honeycomb structure 10 is 2% by mass or less based on the silicon particles, a variation in shape of the honeycomb structure 10 can be suppressed during the production. Each of the contents of impurities Al and Fe in the silicon particles contained in the honeycomb structure 10 is more preferably 1% by mass or less, and even more preferably 0.1% by mass or less.

In the embodiment of the present invention, when the silicon particles contained in the honeycomb structure 10 contain impurities, the impurities are present in the form of adhering to the silicon particles. On the other hand, in the embodiment of the present invention, when the silicon particles contained in the honeycomb structure 10 contain a dopant, the dopant is present while being dissolved in the silicon particles.

The borosilicate may contain an alkaline atom(s). Examples of the alkaline atom include Na, Mg, K, Ca Li, Be, Sr, Cs, and Ba. The borosilicate may contain one or more alkali metal atoms, one or more alkaline earth metal atoms, or a combination of thereof. More preferably, the alkaline atom is Na, Mg, K, or Ca.

As will be described in detail later, the honeycomb structure 10 may have a matrix composed of the borosilicate, and a domain composed of a conductive filler. The matrix is a region that will form a base material of the honeycomb structure 10. It should be noted that the matrix may be amorphous or crystalline. According to such a configuration, the matrix that will form the base material is a region that will dominate electrical resistance when the EHC is heated by current conduction. The matrix has lower temperature-dependency on electrical resistivity than that of SiC materials, and the electrical resistivity shows the PTC property.

The borosilicate may have a total content of alkaline atoms of 10% by mass or less, and more preferably 5% by mass or less, or 2% by mass or less. Such a configuration can easily reduce the electric resistance of the matrix, so that the electrical resistivity of the matrix will further show the PTC property. Further, it is possible to suppress the formation of an insulating glass film due to segregation of the alkaline atoms on the surface side of the honeycomb structure 10 during firing in an oxidizing atmosphere. The lower limit of the total content of alkaline atoms is not particularly limited, but it may be 0.01% by mass or more, or 0.2% by mass or more. The alkaline atom may be intentionally added to suppress the oxidation of the conductive filler. Further, the alkaline atoms will complicate the production steps in order to completely remove them because they are elements that are relatively easily contaminated from the raw materials of the honeycomb structure 10. Therefore, the alkaline atoms are typically contained within the above range. It is also possible to reduce the alkaline atoms by using boric acid in the honeycomb structure 10 without using the borosilicate glass containing the alkaline atoms as a raw material. As used herein, the "total content of alkaline atoms" means, when the borosilicate contains one kind of alkaline atom, the % by mass of the one kind of alkaline atom. Also, it means, when the borosilicate contains kinds of alkaline atoms, the total content (% by mass) of the contents (% by mass) of the plurality of alkaline atoms.

The content of B (boron) atoms in the borosilicate is preferably 0.1% by mass or more and 5% by mass or less. The content of Si (silicon) atoms in the borosilicate is preferably 5% by mass or more and 40% by mass or less. The content of O (oxygen) atoms in the borosilicate is preferably 40% by mass or more and 85% by mass or less. According to such a configuration, it is possible to easily exhibit the PTC property in the honeycomb structure 10.

Examples of the borosilicate that can be used herein include aluminoborosilicate, and the like. Such a configuration can provide the honeycomb structure 10 which has lower temperature-dependency on the electrical resistivity, exhibits the PTC property for the electrical resistivity, or has suppressed temperature-dependency on the electrical resistivity. The content of Al atoms in the aluminoborosilicate may be, for example, 0.5% by mass or more and 10% by mass or less.

In addition to the atoms in the borosilicate as described above, examples of the atoms contained in the borosilicate making up the matrix include Fe and C. The contents of the alkaline atoms, Si, O, and Al, among the atoms described above, can be measured using analyzing equipment of an electron probe microanalyzer (EPMA). The content of B, among the atoms as described above, can be measured using an inductively coupled plasma (ICP) analyzer. According to the ICP analysis, the content of B in the entire honeycomb structure 10 is measured, so that the obtained measurement result is converted into the content of B in the borosilicate.

When the honeycomb structure 10 has the matrix and the silicon particles doped with the dopant, the electrical resistivity of the entire honeycomb structure 10 is determined by adding the electrical resistivity of the matrix and the electrical resistivity of the doped silicon particles together. Therefore, adjusting the conductivity of the doped silicon particles and the content of the doped silicon particles can allow the electrical resistivity of the honeycomb structure 10 to be controlled. The electrical resistivity of the doped silicon particles may exhibit either the PTC property or the NTC property, and there may be no temperature-dependency on the electrical resistivity.

In the present invention, for example, in addition to the silicon particles, Fe—Si-based particles, Si—W-based particles, Si—C-based particles, Si—Mo-based particles, Si—Ti-based particles, and the like may be mentioned. These can be used alone or in combination of two or more.

A rate of increase in electrical resistance of the honeycomb structure 10 is preferably $1 \times 10^{-6}$ to $5 \times 10^{2}$/K. The rate of increase in electrical resistance of the honeycomb structure 10 of $1 \times 10^{-6}$/K or more can lead to easy suppression of a temperature distribution during heating by electrical conduction. The rate of increase in electrical resistance of the honeycomb structure 10 of $5 \times 10^{-2}$/K or less can lead to a decreased change in resistance during heating by electrical conduction. The rate of increase in electrical resistance of the honeycomb structure 10 is more preferably $5 \times 10^{-6}$ to $1 \times 10^{-2}$/K, and more preferably $1 \times 10^{-5}$ to $1 \times 10^{-1}$/K. The rate of increase in electrical resistivity of the honeycomb structure 10 can be determined by, first, measuring the electrical resistivities at two points at 50° C. and 400° C. by the four-terminal method, subtracting the electrical resistivity at 50° C. from the electrical resistivity at 400° C. to derive a value, and dividing the value by a temperature difference 350° C. between 400° C. and 50° C. to calculate the rate of increase in electrical resistivity.

The shape of the honeycomb structure 10 is not particularly limited, and it may have the shape of the honeycomb structure known in the art. As shown in FIGS. 1 and 2, the honeycomb structure 10 may include: an outer peripheral wall 12; and a partition wall 13 which is disposed on an inner side of the outer peripheral wall 12 and defines a plurality of cells 16 penetrating from one end face to other end face to form flow paths.

An outer shape of the honeycomb structure 10 is not particularly limited, and it may have a pillar shape. Examples of the shape of the pillar shaped honeycomb structure 10 includes a shape such as a pillar shape with circular end faces (cylindrical shape), a pillar shape with oval end faces, and a pillar shape with polygonal (quadrangular, pentagonal, hexagonal, heptagonal, octagonal, etc.) end faces. The honeycomb structure 10 preferably has a size such that an area of the end faces is from 2000 to 20000 mm², and more preferably from 5000 to 15000 mm², for the purpose of improving heat resistance (suppressing cracks generated in a circumferential direction of the outer peripheral wall).

A cell shape in a cross section perpendicular to an extending direction of the cells 16 is not limited, but it is preferably a quadrangle, a hexagon, an octagon, or a combination thereof. Among these, the quadrangle and the hexagon are preferred. Such a cell shape can lead to a decreased pressure loss upon flowing of an exhaust gas through the honeycomb structure 10, resulting in improvement of purification performance of the catalyst. The quadrangle is particularly preferable in terms of easily achieving both structural strength and heating uniformity.

The partition wall 13 that defines the cells 16 preferably has a thickness of from 0.1 to 0.3 mm, and more preferably from 0.1 to 0.2 mm. The thickness of the partition wall 13 of 0.1 mm or more can suppress a decrease in the strength of the honeycomb structure 10. The thickness of the partition wall 13 of 0.3 mm or less can suppress an increase in pressure loss upon flowing of an exhaust gas, when the honeycomb structure 10 is used as a catalyst support and a catalyst is supported thereon. As used herein, the thickness of the partition wall 13 is defined as a length of a portion passing through the partition wall 13, among line segments connecting centers of gravity of the adjacent cells 16 in a cross section perpendicular to the extending direction of the cells 16.

The pillar shaped honeycomb structure 10 preferably has a cell density of from 40 to 150 cells/cm$^2$, and more preferably from 70 to 100 cells/cm$^2$, in a cross section perpendicular to a flow path direction of the cells 16. The cell density in such a range can increase the purification performance of the catalyst while reducing the pressure loss upon flowing of an exhaust gas. The cell density of 40 cells/cm$^2$ or more can ensure a sufficient catalyst supporting area. The cell density of 150 cells/cm$^2$ or less can prevent a pressure loss upon flowing of an exhaust gas from being excessively increased when the honeycomb structure 10 is used as a catalyst support and a catalyst is supported thereon. The cell density is a value obtained by dividing the number of cells by an area of one end face of the honeycomb structure 10 excluding the outer peripheral wall 12.

The provision of the outer peripheral wall 12 of the honeycomb structure 10 is useful in terms of ensuring the structural strength of the honeycomb structure 10 and preventing a fluid flowing through the cells 16 from leaking from the outer peripheral wall 12. More particularly, the thickness of the outer peripheral wall 12 is preferably 0.1 mm or more, and more preferably 0.15 mm or more, and even more preferably 0.2 mm or more. However, if the outer peripheral wall 12 is too thick, the strength becomes too high, so that a strength balance between the outer peripheral wall 12 and the partition wall 13 is lost to reduce thermal shock resistance. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in a cross section perpendicular to a cell extending direction.

The partition wall 13 preferably has a porosity of from 0.1 to 20%. The porosity of the partition wall 13 of 0.1% or more allows the catalyst to be easily supported. The porosity of the partition wall 13 of 20% or less can reduce a risk of damage during canning. The porosity of the partition wall 13 is more preferably from 1 to 15%, and even more preferably from 5 to 15%. The porosity is a value calculated by binarizing pores and non-pores (specifically, the ceramic material portions) in the SEM observation image of the partition wall 13.

<Electrically Heating Support>

The electrically heating support 20 according to an embodiment of the present invention includes: the honeycomb structure 10; electrode layers 14a, 14b provided on the surface of the honeycomb structure 10; and pillar shaped electrode terminals 15a, 15b provided on the electrode layers 14a, 14b, respectively.

(Electrode Layer)

The honeycomb structure 10 is provided with the electrode layers 14a, 14b on the surface of the outer peripheral wall 12. The electrode layers 14a, 14b may be a pair of electrode layers 14a, 14b provided so as to face each other across the central axis of the honeycomb structure 10.

The electrode layers 14a, 14b are made of a material having electric conductivity. The electrode layers 14a, 14b are preferably made of oxide ceramics, a mixture of a metal or a metal compound with oxide ceramics, or carbon. The metal may be either an elementary metal or an alloy, and examples of the metal that can be suitably used herein include silicon, aluminum, iron, stainless steel, titanium, tungsten, Ni—Cr alloys and the like. Examples of the metal compounds that can be suitably used herein include those other than oxide ceramics, such as metal oxides, metal nitrides, metal carbides, metal silicides, metal borides, and composite oxides, such as $FeSi_2$, $CrSi_2$, alumina, silica and titanium oxide. Each of the metal and the metal compound may be used alone or in combination with two or more. Specific examples of the oxide ceramics include glass, cordierite, and mullite. The glass may further contain an oxide consisting of at least one component selected from the group consisting of B, Mg, Al, Si, P, Ti and Zr. It is further preferable that the glass further contains at least one selected from the above group, because the strength of the electrode layers 14a, 14b is further improved.

The electrode layers 14a, 14b may be formed in a non-limiting region. In terms of enhancing uniform heat generation of the honeycomb structure 10, each of the electrode layers 14a, 14b is preferably provided on the outer surface of the outer peripheral wall 12 so as to extend in the form of strip in the circumferential direction and in the extending direction of the cells 16. More particularly, it is desirable that each of the electrode layers 14a, 14b extends over a length of 80% or more, and preferably 90% or more, and more preferably the full length, between both end faces of the honeycomb structure 10, from the viewpoint that a current easily spreads in an axial direction of each of the electrode layers 14a, 14b.

Each of the electrode layers 14a, 14b preferably has a thickness of from 0.01 to 5 mm, and more preferably from 0.01 to 3 mm. Such a range can allow uniform heat generation to be enhanced. The thickness of each of the electrode layers 14a, 14b of 0.01 mm or more can lead to appropriate control of electric resistance, resulting in more uniform heat generation. The thickness of 5 mm or less can reduce a risk of breakage during canning. The thickness of each of the electrode layers 14a, 14b is defined as a thickness in a direction of a normal line to a tangential line at a measurement point on an outer surface of each of the electrode layers 14a, 14b when observing the point of each electrode layer to be subjected to thickness measurement in a cross section perpendicular to the cell extending direction.

The electrical resistivity of the electrode layers 14a, 14b is not particularly limited, but it may preferably be $5 \times 10^{-6}$ to 2 Ω·cm. The electric resistivity of the electrode layers 14a, 14b of 2 Ω·cm or less can lead to reduced resistance during heating by electrical conduction. The electrical resistivity of the electrode layers 14a, 14b is more preferably $1 \times 10^{-5}$ to 1 Ω·cm, and even more preferably $5 \times 10^{-4}$ to $0.8 \times 10^{-1}$ Ω·cm. As used herein, the electrical resistivity of the electrode layers 14a, 14b is a value measured at 25° C. by the four-terminal method.

(Electrode Terminal)

Each of the electrode terminals 15a, 15b is formed in a pillar shape. The electrode terminals 15a, 15b are arranged on the electrode layers 14a, 14b, respectively, and are electrically connected. Accordingly, as a voltage is applied to the electrode terminals 15a, 15b, then the electricity is conducted through the electrode terminals 15a, 15b to allow the honeycomb structure 10 to generate heat by Joule heat. Therefore, the honeycomb structure 10 can also be suitably used as a heater. The applied voltage is preferably from 12 to 900 V, and more preferably from 48 to 600 V, although the applied voltage can be changed as needed.

The electrode terminals 15a, 15b may be made of ceramics or carbon, and more preferably ceramics. Non-limiting examples of the ceramics making up the electrode terminals 15a, 15b include silicon carbide (SiC), and metal compounds such as metal silicides such as tantalum silicide ($TaSi_2$) and chromium silicide ($CrSi_2$), and further include a composite material (cermet) containing one or more metals. Specific examples of the cermet include a composite material of metal silicon and silicon carbide, a composite material of metal silicide such as tantalum silicide and chromium silicide, metal silicon, and silicon carbide, and further a composite material obtained by adding to one or more metals listed above, one or more insulating ceramics such as alumina, mullite, zirconia, cordierite, silicon nitride, and aluminum nitride, in terms of decreased thermal expansion. As the carbon making up the electrode terminals 15a, 15b, it is preferable that carbon is the main component. The phrase "the carbon is the main component" means that the carbon content is 50% by mass or more based on all the components making up the electrode terminals 15a, 15b. The carbon content is more preferably 80% by mass or more, and still more preferably 90% by mass or more. The material of each electrode terminal may be the same as that of each electrode layer.

When the electrode terminals 15a, 15b are ceramic terminals, metal terminals (not shown) may be joined to its tips, respectively. The ceramic terminals and the metal terminals can be joined by caulking, welding, a conductive adhesive or the like. The materials of the metal terminals that can be used herein includes conductive metals such as iron alloys and nickel alloys.

The material of each of the electrode terminals 15a, 15b may be a metal. The metal may be an elementary metal, an alloy, or the like, but it is preferably an alloy containing at least one selected from the group consisting of, for example, Cr, Fe, Co, Ni, and Ti from the viewpoint of corrosion resistance, electrical resistance, and linear expansion rate, and more preferably stainless steel and Fe—Ni alloy. The size of each of the metal terminals (not shown) is not particularly limited, and it can be appropriately designed depending on the size, the conducting performance and the like of the electrically heating support 20.

Each outer shape of the electrode terminals 15a, 15b is not particularly limited as long as it is pillar shaped. For example, the electrode terminal 15a, 15b can have a shape such as a pillar shape with circular end faces (cylindrical shape), a pillar shape with oval end faces and a pillar shape with polygonal (quadrangular, pentagonal, hexagonal, heptagonal, octagonal, etc.) end faces. The size of each of the electrode terminals 15a, 15b is not limited, and the electrode terminals 15a, 15b may be formed in a pillar shape in which an area of the end faces is from 10 to 800 $mm^2$, and the height is from 10 to 100 mm, for example.

By supporting the catalyst on the electrically heating support 20, the electrically heating support 20 can be used as a catalyst support. For example, a fluid such as an exhaust gas from a motor vehicle can flow through the flow paths of the plurality of cells 16. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a NOx storage reduction catalyst (LNT catalyst) containing an alkaline earth metal and platinum as storage components for nitrogen oxides (NOx). Illustrative examples of a catalyst that does not use the noble metal include a NOx selective reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

<Methods for Producing Honeycomb Structure and Electrically Heating Support)

The honeycomb structure 10 can be produced according to a known method for producing a honeycomb structure. For example, first, a binder, a surfactant, a pore former, water and the like are added to powder obtained by mixing borosilicate with silicon powder that is not doped with the dopant, or to powder obtained by mixing borosilicate with silicon powder doped with the dopant to prepare a forming raw material. The silicon powder to be contained in the forming raw material is preferably mixed so that the silicon particle content in the honeycomb structure 10 produced via the firing step and the like is 30 to 80% by mass. The dopant amount is appropriately adjusted depending on the dopant elements so that the concentration of the dopant in the silicon particles in the honeycomb structure 10 produced via the firing step and the like is $1 \times 10^{16}$ to $5 \times 10^{20}/cm^3$. An average particle diameter of the silicon powder is preferably 1 to 50 µm, and more preferably 1 to 40 µm. The average particle diameter of the silicon powder refers to an arithmetic average diameter on a volume basis when a frequency distribution of the particle diameter is measured by the laser diffraction method.

The binder includes methyl cellulose, hydroxypropylmethyl cellulose, hydroxypropoxyl cellulose, hydroxyethyl cellulose, carboxymethyl cellulose, polyvinyl alcohol and the like. Among these, methyl cellulose is preferably used in combination with hydroxypropoxyl cellulose. The content of the binder is preferably 2.0 to 15.0% by mass based on the silicon powder doped with the dopant or the powder obtained by mixing the borosilicate with the silicon powder doped with the dopant.

The content of the water is preferably 20.0 to 80.0% by mass based on the silicon powder doped with the dopant or the powder obtained by mixing the borosilicate with the silicon powder doped with the dopant.

The surfactant that can be used herein includes ethylene glycol, dextrin, fatty acid soap, polyalcohol and the like. These may be used alone or in combination of two or more. Alternatively, the surfactant may not be added. The content of the surfactant may preferably be 0.1 to 2.0% by mass based on the silicon powder doped with the dopant or the powder obtained by mixing the borosilicate with the silicon powder doped with the dopant.

The pore former is not particularly limited as long as it forms pores after firing, and examples of the pore former include graphite, starch, foaming resins, water-absorbing resins, and silica gel. The content of the pore former is preferably 0.5 to 10.0 parts by mass when the mass of the powder obtained by mixing the silicon powder doped with the dopant with the borosilicate is 100 parts by mass. The average particle diameter of the pore former is preferably 10 to 30 μm. The average particle diameter of 10 μm or more is preferable because pores can be sufficiently formed. The average particle diameter of 30 μm or less is more preferable because it is difficult to clog the die during the forming. The average particle diameter of the pore former refers to an arithmetic average diameter on a volume basis when a frequency distribution of particle diameter is measured by the laser diffraction method. When the pore former is the water-absorbing resin, the average particle diameter of the pore former is the average particle diameter after water absorption.

The resulting forming raw material is then kneaded to form a green body, and the green body is then extruded to prepare a green (unfired) honeycomb structure. In extrusion molding, a die having a desired overall shape, cell shape, partition wall thickness, cell density and the like can be used. Preferably, the resulting unfired honeycomb structure is then dried. When the length in the central axis direction of the honeycomb structure is not the desired length, both the end faces of the honeycomb structure can be cut to the desired length.

The honeycomb structure 10 is then produced by firing the unfired honeycomb structure. Prior to firing, it is preferable to carry out calcination in order to remove the binder and the like. The calcination is preferably carried out in an air atmosphere at 400 to 500° C. for 0.5 to 20 hours. The methods of calcination and firing are not particularly limited, and they can be carried out using an electric furnace, a gas furnace, or the like. The firing conditions are preferably in an inert atmosphere such as nitrogen or argon at 1150 to 1500° C. for 1 to 20 hours. Thus, the honeycomb structure 10 according to the embodiment of the present invention can be produced.

The electrically heating support 20 according to the embodiment of the present invention can be produced by arranging the electrode layers 14a, 14b on the surface of the honeycomb structure 10, and then forming the pillar shaped electrode terminals 15a, 15b on the electrode layers 14a, 14b, respectively.

<Exhaust Gas Purifying Device>

The electrically heating support according to the above embodiment of the present invention can be used for an exhaust gas purifying device. The exhaust gas purifying device includes the electrically heating support and a can body for holding the electrically heating support. In the exhaust gas purifying device, the electrically heating support can be installed in an exhaust gas flow path for allowing an exhaust gas from an engine to flow. As the can body, a metal tubular member or the like for accommodating the electrically heating support can be used.

EXAMPLES

Hereinafter, the present invention will be specifically described based on Examples. However, the present invention is not limited to Examples.

(1. Production of Honeycomb Structure)

As each of Examples 1 to 5 and Comparative Examples 1 to 3, silicon powder doped with boron nitride and borosilicate were adjusted at a stage after the firing step and the like so as to have the silicon content ratio (silicon content ratio when the silicon powder and the borosilicate were 100% by mass) as shown in Table 1 and then mixed together to prepare a ceramic raw material. To the ceramic raw material were added hydroxypropylmethyl cellulose as a binder, a water-absorbing resin as a pore former, and water to form a forming raw material. The forming raw material was then kneaded by means of a vacuum green body kneader to prepare a cylindrical green body. The content of the binder was 7.0 parts by mass per 100 parts by mass of the total of the silicon powder and the borosilicate. The content of the pore former was 3.0 parts by mass per 100 parts by mass of the total of the silicon powder and the borosilicate. The content of water was 42 parts by mass per 100 parts by mass of total of the silicon powder and the borosilicate. The average particle diameter of the silicon powder was 6 μm. The average particle diameter of the pore former was 20 μm. The average particle diameter of each of the silicon powder and the pore former refers to an arithmetic average diameter on a volume basis, when measuring frequency distribution of the particle diameter by the laser diffraction method.

The resulting cylindrical green body was formed using an extruder to obtain a pillar shaped, unfired honeycomb structure portion in which each cell had a square cross-sectional shape. The resulting unfired pillar shaped honeycomb structure portion was subjected to high-frequency dielectric heating and drying and then dried at 120° C. for 2 hours using a hot air drier, and a predetermined amount of both end faces were cut to prepare a honeycomb structure.

The dried honeycomb structure was degreased (calcined), fired and further oxidized to obtain a honeycomb fired body. The degreasing was carried out at 450° C. for 3 hours. The firing was carried out in an argon atmosphere at 1400° C. for 2 hours.

(2. Formation of Electrode Layer)

A pair of electrode layers was provided so as to face each other across the central axis of the honeycomb structure. The conditions for forming the electrode layers are as follows. That is, first, stainless steel powder (SUS430) and glass powder were mixed at a volume ratio of 40% by volume of stainless powder and 60% by volume of glass powder to prepare a ceramic raw material. The average particle diameter was 10 μm for stainless powder and 2 μm for glass powder. The average particle diameter refers to an arithmetic average diameter on a volume basis when frequency distribution of particle diameters is measured by the laser diffraction method.

Subsequently, to the above ceramic raw material were added 1% by mass of a binder, 1% by mass of a surfactant, and 30% by mass of water to prepare a paste. The paste was then applied to the honeycomb structure using screen printing. The applied paste was dried using a hot air drier at 120° C. for 30 minutes, and then fired together with the honeycomb structure in vacuum at 1100° C. for 30 minutes to form electrode layers. The honeycomb structure was thus produced.

(3. Evaluation Test)

The silicon particle content (B) of the resulting honeycomb structure was measured by the method as described above. The measured results are shown in Table 1.

Further, the dopant amount (A) in the silicon particles of the resulting honeycomb structure was measured by the above method. The measured results are shown in Table 1.

The resulting honeycomb structure had a thickness of the partition wall of 125 μm and a cell density of 90 cells/cm². The cell density was calculated by dividing the number of cells by an area of one end face portion of the honeycomb structure excluding the outer peripheral wall portion.

Further, a pair of metal terminals was electrically connected to the pair of electrode layers of the resulting honeycomb structure, respectively. A voltage of 48 V was then applied to the honeycomb structure through the metal terminals, and a current value was measured. From the voltage and the current value, the volume resistivity of the honeycomb structure was calculated.

The evaluation results are shown in Table 1.

In addition, the oxidation resistance of the resulting honeycomb structure was evaluated by a percentage of change in electrical resistance. As the percentage of change in electrical resistance, a value measured as follows is used. The honeycomb structure is pre-oxidized by maintaining it in the air atmosphere at 1000° C. for 10 hours to prepare a sample. For the sample, the electrical resistivities before and after maintaining in the air atmosphere at 1000° C. for 50 hours are measured. The electrical resistivity of the honeycomb structure is an average value of measured values (n=3) measured by the four-terminal method. Then, the absolute value of a value calculated by the equation: 100×{(electric resistivity after durability after maintaining at 1000° C. for 50 hours)−(initial electrical resistivity before maintaining at 1000° C. for 50 hours)}/(initial electrical resistivity before maintaining at 1000° C. for 50 hours) is defined as the percentage of change in electrical resistivity. For the evaluation results, a level having the percentage of change in electric resistance of 50% or less was determined to be "A", and a level having the percentage of change in electric resistance more than 50% was determined to be "B".

Table 1 shows the test conditions and evaluation results.

TABLE 1

| | Silicon Particle Content in Honeycomb Structure (B) % by mass | Dopant Amount in Silicon Particles (A) Boron Number/cm$^3$ | Volume Rresistivity of Honeycomb Structure Ω·cm | Oxidation Resistance |
|---|---|---|---|---|
| Example 1 | 41 | 8 × 10$^{15}$ | 4.5 | A |
| Example 2 | 41 | 8 × 10$^{17}$ | 1.2 | A |
| Example 3 | 41 | 8 × 10$^{19}$ | 0.04 | A |
| Example 4 | 48 | 8 × 10$^{17}$ | 0.88 | A |
| Example 5 | 77 | 8 × 10$^{17}$ | 1.0 | A |
| Comparative Example 1 | 28 | 2 × 10$^{15}$ | 10.5 | A |
| Comparative Example 2 | 49 | 7 × 10$^{15}$ | 13.1 | A |
| Comparative Example 3 | 85 | 8 × 10$^{18}$ | 0.22 | B |

(4. Discussion)

As shown in Table 1, in each of Examples 1 to 5 of the present invention, the volume resistivity was controlled at a lower level of 0.04 to 4.5 Ω·cm, indicating that the volume resistivity could be controlled in the suitable range (0.001 to 5 Ω·cm) under a lower voltage of 48 V, because the honeycomb structure was made of ceramics containing at least silicon and borosilicate, and the silicon particle content (B) in the honeycomb structure was 30 to 80% by mass, and the dopant amount (A) in the silicon particles was 1×10$^{16}$ to 5×10$^{20}$/cm$^3$. Further, the generation of excess current could be satisfactorily suppressed even under a lower voltage of 48 V.

In Comparative Example 1, the volume resistivity was higher, because the silicon particle content (B) in the honeycomb structure was less than 30% by mass.

In Comparative Example 2, the volume resistivity was higher, because the dopant amount (A) in the silicon particles was less than 1×10$^{16}$.

In Comparative Example 3, the percentage of change in electrical resistance was higher and the oxidation resistance was not sufficient, because the silicon particle content (B) in the honeycomb structure was more than 80% by mass.

DESCRIPTION OF REFERENCE NUMERALS 10 honeycomb structure
12 outer peripheral wall
13 partition wall
14a, 14b electrode layer
15a, 15b electrode terminal
16 cell
20 electrically heating support

The invention claimed is:

1. A honeycomb structure made of ceramics,
wherein the honeycomb structure comprises: a borosilicate; and silicon particles doped with at least one dopant,
wherein the dopant is a Group 13 element or a Group 15 element,
wherein the silicon particles have a dopant amount (A) of 1×10$^{16}$ to 5×10$^{20}$/cm$^3$, and
wherein the honeycomb structure has a silicon particle content (B) of 30 to 80% by mass.

2. The honeycomb structure according to claim 1, wherein 50% by mass or more of a total mass of the honeycomb structure excluding the silicon particle content (B) is the borosilicate.

3. The honeycomb structure according to claim 1, wherein the dopant amount (A) in the silicon particles is 5×10$^{16}$ to 5×10$^{20}$/cm$^3$.

4. The honeycomb structure according to claim 1, wherein the silicon particle content (B) in the honeycomb structure is 30 to 50% by mass.

5. The honeycomb structure according to claim 1, wherein each of contents of impurities Al and Fe in the silicon particles is 2% by mass or less based on the silicon particles.

6. The honeycomb structure according to claim 1, wherein the honeycomb structure has a volume resistivity of 0.001 to 100 Ω·cm.

7. The honeycomb structure according to claim 1, wherein the honeycomb structure is a pillar shaped honeycomb structure comprising: an outer peripheral wall; and a partition wall disposed on an inner side of the outer peripheral wall, the partition wall defining a plurality of cells, each of the cells penetrating from one end face to other end face to form a flow path.

8. An electrically heating support, comprising:
the honeycomb structure according to claim 1;
electrode layers provided on a surface of the honeycomb structure; and
pillar shaped electrode terminals provided on the electrode layers, respectively.

* * * * *